C. PEARSON.
MOWING MACHINE.
APPLICATION FILED FEB. 17, 1916.

1,314,605.

Patented Sept. 2, 1919.
4 SHEETS—SHEET 1.

Inventor:
Charles Pearson,
By Chas. E. Lord
Atty.

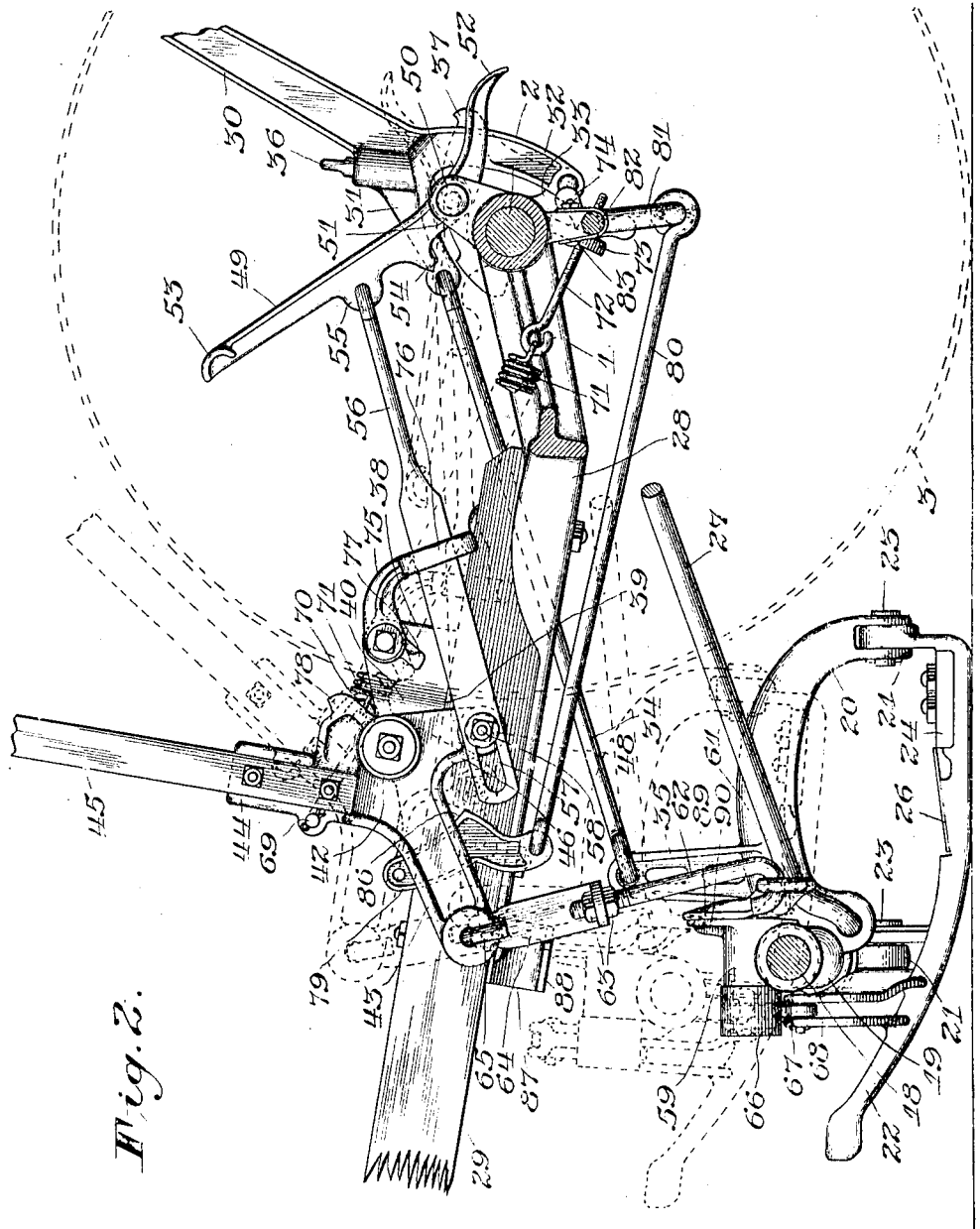

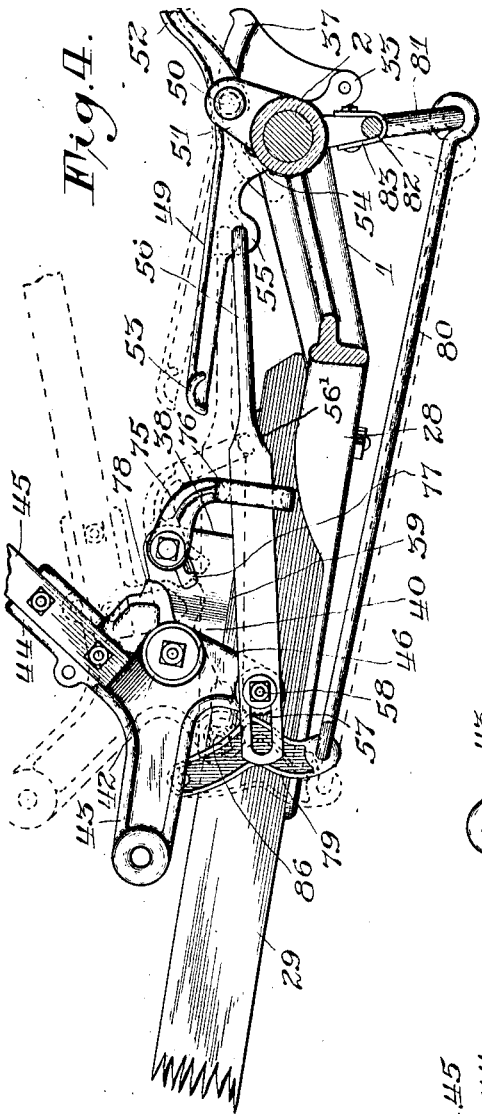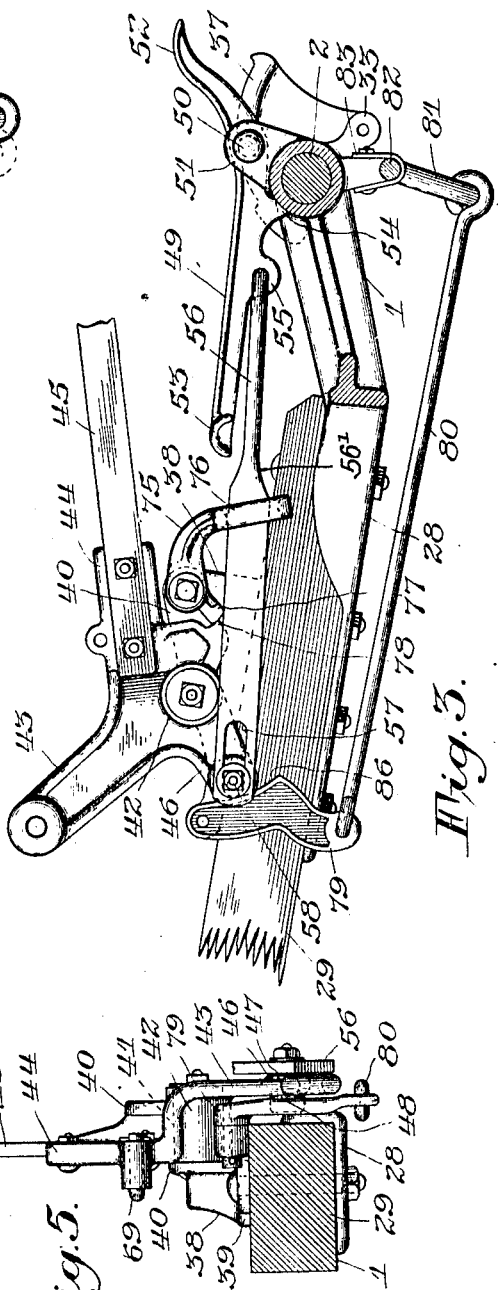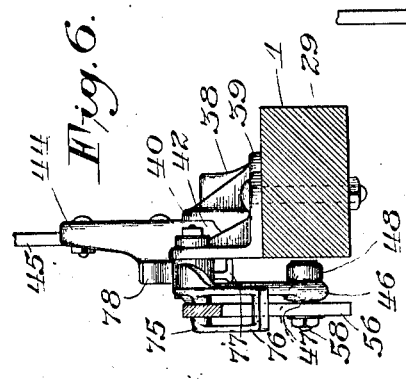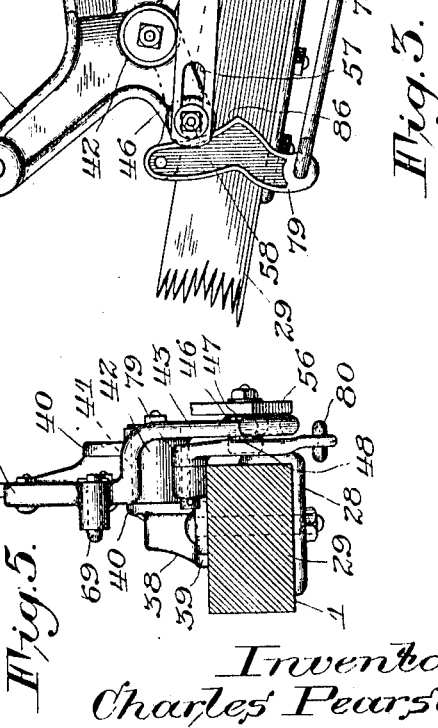

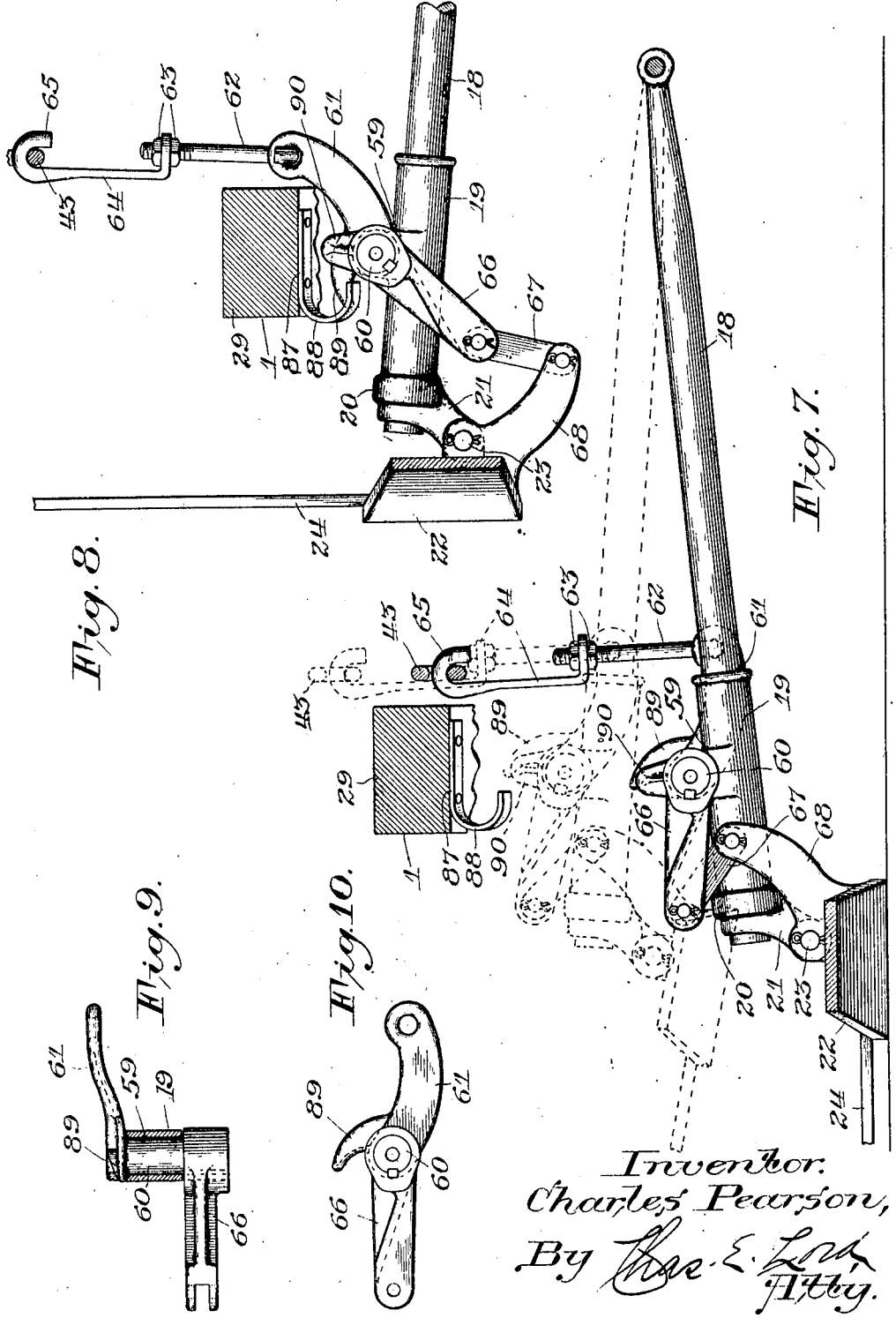

UNITED STATES PATENT OFFICE.

CHARLES PEARSON, OF CHICAGO, ILLINOIS, ASSIGNOR, BY MESNE ASSIGNMENTS, TO INTERNATIONAL HARVESTER COMPANY, A CORPORATION OF NEW JERSEY.

MOWING-MACHINE.

1,314,605.     Specification of Letters Patent.     Patented Sept. 2, 1919.

Application filed February 17, 1916. Serial No. 78,794.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a full, clear, and exact specification.

My invention relates to mowing machines of the vertical lift type.

The invention has among its objects to provide means whereby the coupling frame and finger bar of a mower may be raised from operative to plain lift position and subsequently be returned to operative position through the independent manipulation of any one of a plurality of lifting and releasing means.

A further object is to provide means whereby the coupling frame may be raised by one set of lifting mechanism, be automatically locked in raised position, and be released by the lifting mechanism used to raise it or by independent lifting and releasing mechanism.

A still further object is to provide means whereby the finger bar may be raised from an operative to a vertical position, in combination with means actuated by the raising and lowering mechanism whereby the clutch mechanism forming a part of the power transmission gearing is positively disengaged when the finger bar has been raised to a predetermined degree of elevation and permitted to reëngage when the finger bar has reached an angle of safety in its return to an operative position.

A still further object is to provide means whereby the coupling frame is temporarily retained in a raised position during an initial movement of the raising and lowering mechanism in returning the finger bar to an operative position.

In the embodiment of the invention shown, these objects are attained by means of a hand lever, a foot lever, toggle mechanism connecting these levers, means for locking the hand lever in position to sustain the coupling frame and finger bar in vertical position, and means for unlocking the hand lever and for unlocking the toggle mechanism, and means operatively connected to said levers for clutching and unclutching the power transmission gearing as the levers are operated.

One embodiment of the means by which these objects are attained is illustrated in the accompanying drawings, in which—

Fig. 2 is a side elevation, partly in section and on an enlarged scale, of Fig. 1;

Fig. 3 is a side view of part of the finger bar adjusting means shown in Fig. 2 and illustrating the operation of part of the clutch controlling mechanism when actuated in one direction by the finger bar adjusting means;

Fig. 4 is a similar view illustrating the movement of the clutch controlling means in an opposite direction;

Fig. 5 is a front end elevation of part of Fig. 1;

Fig. 6 is a rear end elevation of part of Fig. 1;

Fig. 7 is a front elevation of the coupling frame, parts of the finger bar, and parts of the finger bar adjusting mechanism;

Fig. 8 is a front elevation of part of Fig. 7, illustrating the operation of the finger bar adjusting means in raising the bar to a vertical position;

Fig. 9 is a top plan view of part of the gag lever mechanism forming part of the finger bar adjusting means; and Fig. 10 is an end elevation of Fig. 9.

Figure 1:
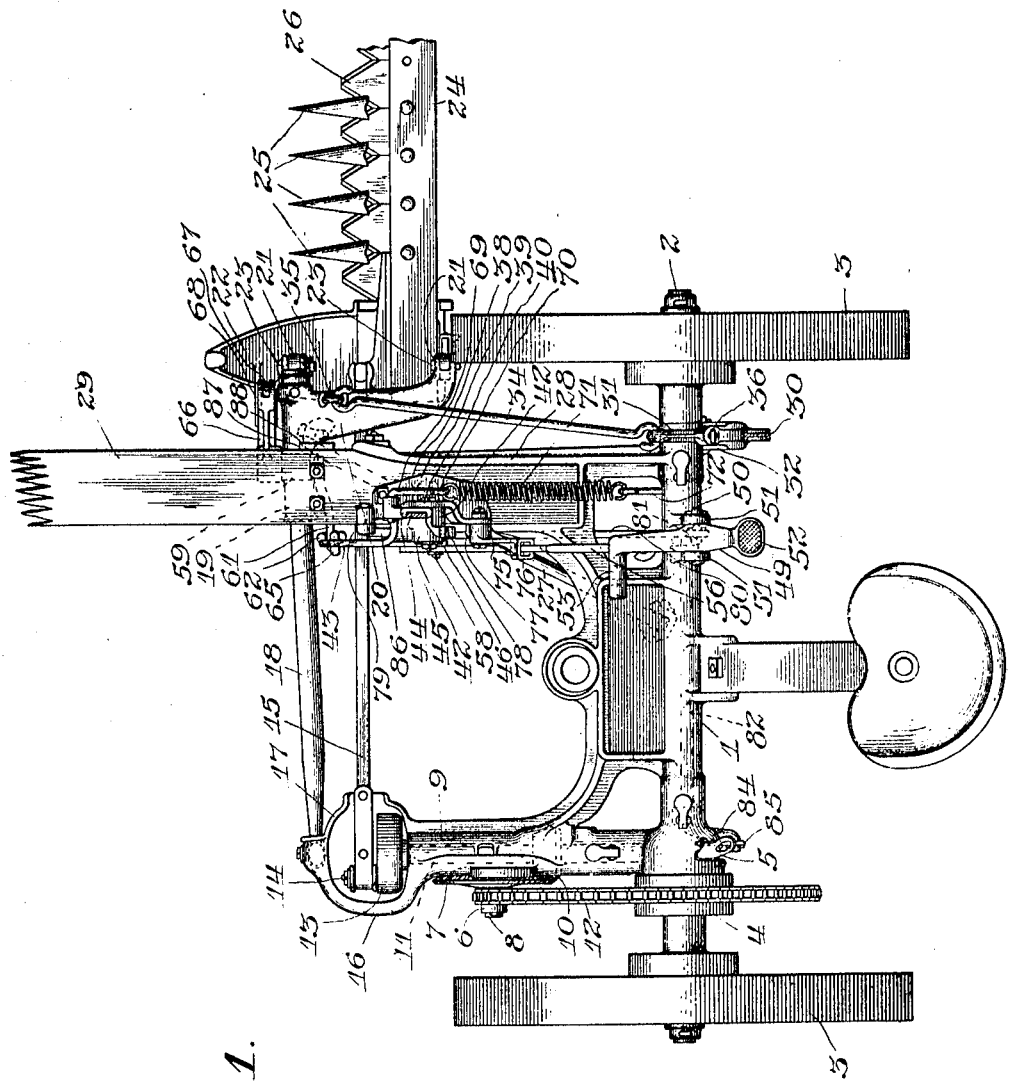
Figure 1 is a top plan view of part of a mowing machine embodying my invention.

Referring to the drawings, wherein the same reference characters designate like parts throughout the several views, 1 represents the main frame of the machine, 2 a driving axle journaled therein, 3 carrying and traction wheels mounted upon opposite ends of the axle, 4 a driving sprocket wheel mounted upon the axle, and coöperating therewith is a spring-pressed clutch mechanism including a clutch shipping member 5 adapted to turn in opposite directions about the axis of the axle and in a manner to disengage or permit the engagement of the clutch mechanism, 6 a driven sprocket wheel integral with a gear wheel 7 journaled upon a stud 8 carried by a forwardly extending tubular arm 9 forming part of the main frame 1, 10 a pinion secured to a shaft 11 journaled in the arm 9 and meshing with the gear wheel 7, 12 a chain operatively connecting the two sprocket wheels, 13 a crank wheel secured to the front end of the shaft 11, 14 a crank pin carried by the crank wheel, having one end of a pitman 15 operatively connected therewith, 16 a bowl-like extension of the tubular arm 9, protecting the crank wheel and having a front wall 17, to which is pivotally connected the stubbleward end of a transversely disposed coupling bar 18 that loosely receives a sleeve 19 at its opposite end that forms part of a coupling yoke 20 having depending arms 21 spaced apart in the direction of the line of draft of the machine and pivotally connected to an inner shoe 22 by means of hinge pins 23, 24 a finger bar secured to the shoe and carrying guards 25, 26 a knife coöperating with the finger bar and operatively connected with the opposite end of the pitman 15, 27 a push bar disposed diagonally to the line of draft, having its front end pivotally connected with the yoke 20 and its rear end with the main frame 1, 28 a forwardly extending main frame member having the rear end of a draft tongue 29 secured thereto, 30 a tilting lever having front and rear arms 31 and 32, respectively, disposed upon opposite sides of the frame member 1, the arm 32 being pivotally connected with an ear member 33 integral with the frame, and the remaining arm with the rear end of a link 34 having its front end connected with an eye 35 carried by the yoke 20, the tilting lever carrying a common form of sliding detent 36 that operatively engages with a toothed sector 37 carried by the frame of the machine.

38 represents a bracket having a base 39 whereby it is secured to the draft tongue, and a vertically disposed side member 40, having a laterally extending boss 41 integral therewith and upon which is journaled a sleeve member 42 forming part of a finger bar adjusting mechanism including a forwardly extending arm 43, a rearwardly inclined arm 44, to which is secured a hand lever 45, and a downwardly inclined arm 46 having laterally extending barrel members 47 upon opposite sides of its free end, and 48 represents a roller journaled upon the barrel member adjacent the tongue. 49 represents a foot lever pivoted intermediate its end upon a pin 50 carried by ear members 51 integral with the main frame, having a heel engaging part 52 at its rear end and a laterally extending toe portion 53 at its front end whereby the operator may rock the lever in opposite directions, and a depending web member along the under side of its body that is provided with a shoulder portion 54 adapted to engage with the main frame in a manner to limit a forward throw of the lever, and a depending ear member 55 to which is pivotally connected the rear end of a bar 56 having an elongated opening 57 at its front end that receives the remaining barrel member 47 upon the arm 46, and 58 represents a bolt securing the associated parts in operative relation.

The bar 56 is also provided on its under side with a curved portion $56^1$ for a purpose to be hereinafter described.

From an inspection of the showing in dotted line position in Fig. 2 and in full line position in Fig. 4, which showing illustrates the position of the hand lever 45 and the coöperating parts when the coupling frame and finger bar have been raised to plain lift position, it will be seen that the pivot of the bar 56 on ear 55 of the foot lever 49 is located below a line connecting the pivot bolt 58 of bar 56 on the arm 46 to pivot pin 50 on which the foot lever 49 is pivoted. There is formed, therefore, a toggle connection between these parts by which the weight of the coupling frame and finger bar is sustained in the raised position illustrated in dotted lines in Fig. 7.

The sleeve 19 is provided intermediate its ends with a bearing member 59 disposed in a fore and aft direction, and journaled therein is a stem 60 having integral with its rear end an arm 61, having its free end pivotally connected with the lower end of a vertically disposed link 62 having its upper end threaded and provided with nuts 63 whereby it is adjustably secured to the lower end of a link member 64 having its upper end provided with a hook 65 whereby it is pivotally connected with the free end of the arm 43, and secured to the opposite end of the stem is an arm 66, having its free end pivotally connected with the upper end of a link 67 that has its lower end pivotally connected with the upper end of an arm 68 integral with the shoe 22 and extending stubbleward of the axis of the hinge connection between the shoe and coupling yoke, the two arms 61 and 66 forming a gag lever.

The counterbalancing mechanism includes a link 69 having its front end pivotally connected with the arm 44 of the finger bar adjusting lever and its rear end provided with a hook 70 whereby it is connected with the front end of a tension spring 71, having its rear end connected with the front end of a link 72, having its rear end threaded and received by an opening in a depending ear member 73 integral with the main frame of the machine and provided with a winged nut 74 whereby the tension of the spring may be regulated. 75 represents a detent member pivotally mounted upon the rear end of the part 40 of the bracket 38 and provided with a rearwardly extending downwardly curved slotted arm 76 that slidably receives the body of the bar 56, and a forwardly extending lug 77 that is adapted to engage with a tooth 78 carried by the arm 44 of the lifting lever. 79 represents a swinging pendent cam lever having its upper end pivotally connected with the part 40 of the bracket 38 and its lower end with the front end of a rod 80, having its opposite end pivotally connected with a depending arm 81 integral with the grassward end of a rock shaft 82 journaled in bearings 83 carried by the main frame below the axle, the stubbleward end of the rock shaft being provided with a crank arm 84 that is operatively and slidably connected, by means of a link 85, with the clutch shipping member 5, as shown in Fig. 1. 86 represents the cam face of the lever 79, and it is adapted to engage with the roller 48 carried by the arm 46 of the finger bar adjusting lever in a manner to cause the roller to swing the pendent lever about its axis when the hand lever is thrown rearward. 87 represents a coupling bar supporting member secured to the bottom of the draft tongue, and includes a downwardly and stubblewardly turned hook portion 88 adapted to be engaged by a curved arm 89 forming part of the arm 61 when the coupling frame has been raised to a predetermined height, as shown in Fig. 8, and 90 represents a vertically disposed stop member extending above the bearing member 59 and adapted to contact with the supporting member 87 in a manner to limit an upward movement of the coupling bar.

In operation, with the finger bar in an operative position and the coupling frame lowered, as shown in Figs 2 and 7, the hand lever 45 in an approximately vertical position and the foot lever 49 is rocked rearward in a convenient position for manipulation by the foot of the operator, the rear wall of the slotted opening 57 in the bar 56 contacts with the barrel member 47 upon the arm 46, and the counter-balancing spring 71 is applying power to the arm 44 to turn it about its axis in a direction to lift the coupling bar and finger bar in a manner to carry part of the weight not required for an efficient operation of the cutting apparatus in following the surface of the ground. To raise the coupling bar and finger bar to plain lift position to pass over ordinary obstructions, or when turning the machine at a corner, the operator presses forward upon the foot lever 49 or pulls rearwardly on the hand lever 45 and thereby, through the bar 56, turns the arm 43 about its axis in a direction to lift the coupling bar and finger bar to the required plane without interfering with the operation of the power transmission gearing as controlled by the clutch mechanism, the associated parts of the mechanism moving to the positions shown by dotted lines in Fig. 7, with the roller 48 upon the arm 46 about to engage with the cam face 86 of the pendent lever 79. To lower the coupling bar and coupling frame and finger bar to operative position, the operator may press with his heel on the part 52 of foot lever 49, thereby breaking the toggle and allowing the parts to assume their operative position, or he may pull the hand lever 45 rearwardly, thereby bringing the tooth 78 into contact with the forwardly extending lug 77, forcing the downwardly curved slotted arm 76 rearwardly to the position shown in dotted lines in Fig. 4. In this position the lower end of the slot in the arm 76 will contact with and bear against the under side of the connecting bar 56, forcing this bar to the position shown in dotted lines in Fig. 4 and breaking the toggle. The lower end of the slot in the arm 76 in its rearmost position will contact with and bear against the curved portion 56¹ of the bar 56, and will support said bar when the hand lever 45 is again pressed forwardly to lower the coupling frame, thereby preventing the toggle joint from again locking the parts in the position shown in full lines in Fig. 4.

From the above description it will be seen that the coupling frame and finger bar can be raised to plain lift position and lowered to operative position entirely by means of the foot lever, or entirely by means of the hand lever, and that in either case the coupling frame will be locked in this plain lift position by means of the toggle joint formed by the connecting bar which connects the downwardly extending portion of the hand lever with the forwardly extending portion of the foot lever. When it is desired to raise the finger bar to a vertical position the hand lever 45 is moved rearward, throwing the arm 43 upward and, through its link connection, rocking the arms 61 and 66 of the gag lever in a direction to cause the link 67 to turn the shoe 22 about its axis when the coupling bar has carried the stop member 90 against the supporting member 87, and further movement rearward of the hand lever will rock the arm 61 about its axis and cause the curved arm 89 to engage with the hooked end 88 of the member 87 in a manner to temporarily retain the coupling bar in an elevated position. When the hand lever 45 is thrown rearward from the position shown in dotted lines in Fig. 2, it carries the roller 48 upon the arm 46 against the pendent cam lever 79, which, through its link connection, turns the rock shaft 82 in a direction to disengage the clutch mechanism before the finger bar has reached such a degree of inclination as will make unsafe the continued operation of the cutting apparatus. The lever 79 will rock the shaft through a degree of movement sufficient to disengage the clutch mechanism, leaving it in position to reëngage automatically when the arm 46 has carried the roller below and off the cam of the pendent lever 79 and the cutting apparatus has reached a safety angle of inclination. The operator can manipulate the clutch shipping member 5 independent of the automatic clutch controlling mechanism when the cutting apparatus is in an operative position. The independent manipulation of the clutch shipping member 5 is provided for by the slidable connection betwen the link 85 and said shipping member 5, this slidable connection enabling the operator to raise and lower the shipping member without changing the position of the link 85 and rock shaft 82. This detail of construction forms no part of the subject matter of the claims and is not, therefore, more specifically shown and described. When the hand lever 45 is thrown rearward, bringing the finger bar to a vertical position, the lug 77 upon the detent 75 engages with the tooth 78 on the arm 44 in a manner to first turn the lug downward until the tooth passes the lug, when, actuated by gravity, the detent will swing in an opposite direction and bring the lug into locking engagement with the tooth, as shown in Fig. 3, and thereby lock the finger bar in a vertical position. To release the detent the operator depresses the rear end of the foot lever, thereby causing the bar 56 to raise the rear end of the detent and turn the lug from engagement with the tooth, and then the end of the lever may be pushed forward and the arm 43 will, through its relatively longitudinal unyielding connection with the arm 61, force the finger bar to swing outward and downward toward an operative position, while the coupling bar is retained in a suspended position by means of the engagement of the curved arm 89 with the supporting member 87 until the finger bar has reached an angle of safety and the clutch mechanism permitted to engage.

Having shown and described one embodiment of my invention, I do not desire that it be limited to the precise details of the structure as illustrated, it being understood that changes may be made in the form, proportion and organization of the various parts of the mechanism without departing from the spirit of the invention as indicated by the appended claims.

What I claim as my invention, and desire to secure by Letters Patent, is:

1. A mowing machine including, in combination, a main frame, a coupling bar pivotally connected with said frame, a finger bar hingedly connected with said coupling bar, means for adjusting said coupling bar and finger bar to various planes, a rigid coupling bar support carried by said frame, and means carried by said adjusting mechanism coöperating with said coupling bar support in a manner to temporarily retain said coupling bar in an elevated position.

2. A mowing machine including, in combination, a main frame, a coupling bar pivotally connected with said frame, a finger bar hingedly connected with said coupling bar, means for adjusting said coupling bar and finger bar to various planes, a coupling bar support carried by said frame, and means carried by said adjusting means and normally out of contact with said support for temporarily retaining said coupling bar in an elevated position, said support being located in the path of movement of the means carried by said adjusting means.

3. A mowing machine including, in combination, a main frame, a coupling bar pivotally connected with said frame, a finger bar hingedly connected with said coupling bar, means for adjusting said coupling bar and finger bar to various planes, said means including a hand lever carried by said main frame, a vibratable gag lever carried by said coupling bar having one end flexibly connected with said finger bar and its opposite end with said hand lever, a coupling bar support carried by said frame and having a depending hook portion, and a curved arm on said gag lever adapted to interlock with said hook in a manner to temporarily retain said coupling bar in an elevated position.

4. A mowing machine including, in combination, a main frame, a coupling bar having one end pivotally connected with said frame, a yoke journaled upon the free end of said coupling bar, a shoe having a hinge connection with said yoke, a vertically disposed arm on said shoe, a finger bar carried by said shoe, means for adjusting said coupling bar and finger bar to various planes, said means including a hand lever pivotally mounted upon said frame, a gag lever pivoted intermediate its ends upon said yoke, a link connecting one end of said gag lever with the arm on said shoe, a link connection between the opposite end of said lever and said hand lever, a stop member carried by said yoke and adapted to engage with a fixed part of said frame in a manner limiting an upward movement of said coupling bar, a coupling bar support carried by said frame, and an arm on said gag lever adapted to engage with said support in a manner to temporarily retain said coupling bar in an elevated position.

5. A mowing machine including, in combination, a main frame, a rising and falling cutting apparatus carried by said frame, means for adjusting said cutting apparatus to various planes, said means including a hand lever pivotally mounted on said frame, a foot lever pivotally mounted on said frame, a bar connecting said foot lever with said hand lever, a detent pivoted upon a fixed part of said frame and adapted to engage with said hand lever in a manner to lock it against movement in one position of its adjustment, the locking connection of said detent being controlled by said bar.

6. A mowing machine including, in combination, a main frame, a rising and falling cutting apparatus carried by said frame, means for adjusting said cutting apparatus to various planes, said means including a hand lever pivotally mounted on said frame, a foot lever pivotally mounted on said frame, a bar connecting said foot lever with said hand lever, a detent pivotally mounted on a fixed part of said frame and having a lug thereon adapted to engage with said hand lever in a manner to lock it against movement in one position of its adjustment, and an arm on said detent having a slotted opening therein slidably receiving the body of said bar whereby the locking connection of said detent is controlled by a rocking movement of said foot lever.

7. A mowing machine including, in combination, a main frame, a rising and falling coupling frame carried thereby, means for raising and lowering said coupling frame, a detent pivoted to said main frame for locking said raising and lowering means against movement in one position of its adjustment, and means operatively connected to said detent for releasing the same from locking position.

8. A mowing machine including, in combination, a main frame, a coupling bar pivotally connected to said frame, a finger bar hingedly connected to said coupling bar, means including a lever for adjusting said coupling bar and finger bar to various planes, a stationary coupling bar support carried by said frame, and means carried by said adjusting means coöperating with said coupling bar and support for temporarily retaining said coupling bar in elevated position.

9. A mowing machine including, in combination, a main frame, a coupling bar pivotally connected to said frame, a finger bar hingedly connected to said coupling bar, means for adjusting said finger bar and coupling bar to various planes, said means including a hand lever carried by said main frame, a lever carried by said coupling bar and operatively connected with said hand lever, a coupling bar support carried by said frame, and means carried by said coupling bar lever and operated by said adjusting means adapted to interlock with said coupling bar support and temporarily retain said coupling bar in an elevated position.

10. A mowing machine including, in combination, a mower frame, a coupling frame carried thereby, a hand lever for raising and lowering said coupling frame, a foot lever for raising and lowering said coupling frame, and toggle mechanism for locking said coupling frame in raised position, said toggle mechanism being automatically actuated to lock said coupling frame when said levers have reached a predetermined position of adjustment, and being releasable by either of said levers.

11. A mowing machine including, in combination, a mower frame, a coupling frame carried thereby, a lever operatively connected to said coupling frame for raising and lowering the same, toggle mechanism operatively connected to said lever for locking the coupling frame in a raised position, and means including a detent pivoted to said mower frame, operable by said lever for releasing said toggle mechanism.

12. A mowing machine including, in combination, a mower frame, a coupling frame carried thereby, a lever operatively connected to said coupling frame for raising and lowering the same, toggle mechanism for locking said frame in a raised position operable when the lever has reached a predetermined position in its movement to raise said coupling frame, and means operated by a further movement of said lever in the same direction to unlock said toggle mechanism.

13. A mowing machine including, in combination, a mower frame, a coupling frame carried thereby, a lever operatively connected to said coupling frame for raising and lowering the same, toggle mechanism for locking the frame in raised position and operable when the same has reached a predetermined position in its movement to raise the coupling frame, means operated by a further movement of said lever in the same direction to unlock said toggle mechanism and to hold said mechanism in unlocked position when the lever is moved in a direction to lower the coupling frame.

14. A mowing machine including, in combination, a mower frame, a coupling frame carried thereby, a lever operatively connected to said coupling frame for raising and lowering the same, toggle mechanism for locking said coupling frame in plain lift position, means for locking said frame in vertical lift position, and means for unlocking said toggle and holding the toggle in released position when the lever is actuated to lower the coupling frame from vertical lift position to operative position.

15. A mowing machine including, in combination, a mower frame, a coupling frame carried thereby, a lever operatively connected to said coupling frame for raising and lowering the same, toggle mechanism for locking said coupling frame in plain lift position, means for locking said coupling frame in vertical lift position, and means controlled by said lever for unlocking said toggle and for holding the same in released position when the lever is actuated to lower the coupling frame from vertical lift position to operative position.

In testimony whereof I affix my signature.

CHARLES PEARSON.

Copies of this patent may be obtained for five cents each, by addressing the "Commissioner of Patents, Washington, D. C."